US009926503B2

(12) United States Patent
Laumola et al.

(10) Patent No.: US 9,926,503 B2
(45) Date of Patent: *Mar. 27, 2018

(54) PROCESS AND SYSTEM FOR PRODUCING FUEL COMPONENTS

(75) Inventors: Heli Laumola, Helsinki (FI); Jari Kotoneva, Lappeenranta (FI); Arto Rissanen, Lappeenranta (FI); Jaakko Nousiainen, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 228 days.

This patent is subject to a terminal disclaimer.

(21) Appl. No.: 13/989,371

(22) PCT Filed: Nov. 25, 2011

(86) PCT No.: PCT/FI2011/051046
§ 371 (c)(1),
(2), (4) Date: May 23, 2013

(87) PCT Pub. No.: WO2012/069706
PCT Pub. Date: May 31, 2012

(65) Prior Publication Data
US 2013/0245342 A1    Sep. 19, 2013

(30) Foreign Application Priority Data
Nov. 26, 2010 (FI) ...................................... 20106252
Mar. 3, 2011 (FI) ...................................... 20115217

(51) Int. Cl.
*C10L 1/02*    (2006.01)
*B01D 1/22*    (2006.01)
(Continued)

(52) U.S. Cl.
CPC ................ *C10L 1/02* (2013.01); *B01D 1/065* (2013.01); *B01D 1/22* (2013.01); *B01D 3/02* (2013.01);
(Continued)

(58) Field of Classification Search
CPC ... C10G 3/40; C10G 3/42; C10G 3/50; C10G 2400/08; C10G 2400/04; C10G 2400/02;
(Continued)

(56) References Cited

U.S. PATENT DOCUMENTS 2,200,468 A    5/1940 Cirves
2,296,952 A    9/1942 Ross et al.
(Continued)

FOREIGN PATENT DOCUMENTS

CA    2349780 A1    6/2001
CN    103391986 A    11/2013
(Continued)

OTHER PUBLICATIONS

Parveen Kumar et al: "Methods for Pretreatment of Lignocellulosic Biomass for Efficient Hydrolysis and Biofuel Production", Industrial & Engineering Chemistry Research, American Chemical Society, US, vol. 48, No. 8, Apr. 15, 2009 (Apr. 15, 2009), pp. 3713-3729, XP008147200.
(Continued)

*Primary Examiner* — Philip Y Louie
(74) *Attorney, Agent, or Firm* — Cantor Colburn LLP

(57) ABSTRACT

The present invention relates to a process and system for producing fuel components, and more particularly to a process and system for producing fuel components from a material of biological origin. The process is a two-step or a three-step process comprising purifying of the feed material by evaporating and refining the purified feed material in the presence of at least one catalyst to form a mixture of
(Continued)

hydrocarbon compounds from which mixture liquid hydrocarbon compounds are separated and further fractionated into fuel components. The present invention relates further to fuel components obtained by the process of the present invention as well as to the use of the fuel components and a mixture comprising the fuel components.

24 Claims, 3 Drawing Sheets

(51) Int. Cl.
| | | |
|---|---|---|
| B01D 1/06 | (2006.01) | |
| C10G 3/00 | (2006.01) | |
| C11B 13/00 | (2006.01) | |
| C10L 1/18 | (2006.01) | |
| B01D 3/14 | (2006.01) | |
| B01D 3/02 | (2006.01) | |

(52) U.S. Cl.
CPC .............. B01D 3/14 (2013.01); C10G 3/40 (2013.01); C10G 3/42 (2013.01); C10G 3/50 (2013.01); C10L 1/1802 (2013.01); C11B 13/005 (2013.01); C10G 2300/1014 (2013.01); C10G 2300/205 (2013.01); C10G 2300/301 (2013.01); C10G 2400/02 (2013.01); C10G 2400/04 (2013.01); C10G 2400/08 (2013.01); C10G 2400/26 (2013.01); C10L 2200/0469 (2013.01); C10L 2270/023 (2013.01); C10L 2270/026 (2013.01); C10L 2270/04 (2013.01); C10L 2290/543 (2013.01); Y02E 50/13 (2013.01); Y02P 30/20 (2015.11); Y02T 50/678 (2013.01); Y02W 30/74 (2015.05)

(58) Field of Classification Search
CPC .......... C10G 2400/26; C10G 2300/301; C10G 2300/205; C10G 2300/1014; B01D 3/14; B01D 1/00; B01D 1/0064; C10L 1/1802; C11B 13/005; Y02W 30/74; Y08T 50/678; Y08T 50/13
USPC ............ 585/14, 240, 242, 818; 44/605, 606; 203/71, 72, 73, 80, 89
See application file for complete search history.

(56) References Cited

U.S. PATENT DOCUMENTS

| | | | |
|---|---|---|---|
| 2,716,630 | A | 8/1955 | Spangenberg et al. |
| 2,886,492 | A | 5/1959 | Hanson et al. |
| 2,894,880 | A | 7/1959 | Sisson et al. |
| 3,449,313 | A | 6/1969 | Bolger et al. |
| 3,644,179 | A * | 2/1972 | Knoer et al. .................. 530/205 |
| 3,887,537 | A | 6/1975 | Harada et al. |
| 4,524,024 | A | 6/1985 | Hughes |
| 5,705,722 | A | 1/1998 | Monnier et al. |
| 5,705,822 | A | 1/1998 | Monnier et al. |
| 5,969,092 | A | 10/1999 | Karvo |
| 6,409,882 | B1 | 6/2002 | Hayden |
| 8,680,324 | B2 | 3/2014 | Hamunen et al. |
| 8,735,637 | B2 | 5/2014 | Stiggson et al. |
| 9,079,845 | B2 | 7/2015 | Sato et al. |
| 9,175,228 | B2 | 11/2015 | Nousiainen et al. |
| 9,181,494 | B2 | 11/2015 | Nousiainen et al. |
| 2005/0033027 | A1 | 2/2005 | Rohr et al. |
| 2005/0051419 | A1 | 3/2005 | Zima et al. |
| 2005/0203279 | A1 | 9/2005 | Rojas et al. |
| 2007/0131579 | A1 | 6/2007 | Koivusalmi et al. |
| 2009/0163744 | A1 | 6/2009 | Abhari et al. |
| 2010/0038284 | A1 | 2/2010 | Vergel |
| 2010/0137556 | A1 | 6/2010 | Hamunen |
| 2011/0160505 | A1* | 6/2011 | McCall .......................... 585/310 |
| 2012/0004390 | A1 | 1/2012 | Zhao et al. |
| 2012/0088943 | A1* | 4/2012 | Knuuttila et al. ............ 585/310 |
| 2012/0151828 | A1 | 6/2012 | Kalnes |

FOREIGN PATENT DOCUMENTS

| | | | |
|---|---|---|---|
| DE | 2736357 | A1 | 2/1979 |
| EP | 1291355 | A1 | 3/2003 |
| EP | 0872528 | B1 | 12/2004 |
| EP | 1586624 | A1 | 10/2005 |
| EP | 1637582 | A1 | 3/2006 |
| EP | 1741768 | A1 | 1/2007 |
| FI | 100248 | B | 8/1997 |
| FI | 960525 | A | 8/1997 |
| WO | 03038020 | A1 | 5/2003 |
| WO | 2004074233 | A1 | 9/2004 |
| WO | 2007003708 | A1 | 1/2007 |
| WO | 2007050030 | A1 | 5/2007 |
| WO | 2008017730 | A1 | 2/2008 |
| WO | 2008/101945 | A1 | 8/2008 |
| WO | 2009/011639 | A2 | 1/2009 |
| WO | 2009015055 | A2 | 1/2009 |
| WO | 2009/131510 | A1 | 10/2009 |
| WO | 2009125072 | A1 | 10/2009 |
| WO | 2010097519 | A2 | 9/2010 |
| WO | 2010/128208 | A2 | 11/2010 |
| WO | 2012069704 | A1 | 5/2012 |
| WO | 2012069705 | A1 | 5/2012 |
| WO | 2012069706 | A2 | 5/2012 |

OTHER PUBLICATIONS

International Search Report of PCT/FI2011/051046.
International Preliminary Report on Patentability of PCT/FI2011/051046.
Finnish Search Report of FI 20115217.
Betti, C. et al. "Sulfur Resistance of Pt-W Catalysts", Journal of Chemistry, vol. 2013, Article ID 502014, 8 Pages, http://dx.doi.org/10.1155/2013/502014, 2013.
Budian, Z. et al. "Rectification and utilization of tall oil", Chemical Industry Research Institute of Fujian Province, Fuzhou 350013, 3 Pages, 1995.
Coll, R. et al. "Corversion of the Rosin Acid Fraction of Crude Tall Oil into Fuels and Chemicals", Energy & Fuels, 2011, vol. 15, pp. 1166-1172.
Folarin, O.M. et al. "Thermal Stability Studies on Some Metal Soaps of Hura Crepitans Seed Oil"; Electronic Journal of Environmental, Agricultural and Food Chemistry, 2011, vol. 10, Issue 8, pp. 2623-2628.
Gunstone F., Vegatable Oils in Food Technology 2002, 3 pages.
Harvey, B. et al. "High-Density Renewable Fuels Based on the Selective Dimerization of Pinenes", Energy Fuels, 2010, vol. 24, pp. 267-273.
Hookey, G. "ASTM Standard D86: Standard Test Method for Distillation of Petroleum Products", National Transportation Safety Board, Washington, D.C., 14 Pages, 2004.
Lin, Y. et al "Research Status of Biodiesel from Tall Oil", Journal of China Paper: Transaction of China Pulp and Paper, 2010, vol. 25, No. 3, pp. 73-76.
Marker, T.L. "Opportunities for Biorenewables in Oil Refineries: Final Technical Report"; Submitted to: U.S. Department of Energy; Period of Performance: Dec. 1, 2004 to Apr. 15, 2005; 60 Pages.
Norlin, L.H. "Tall Oil"; Ullmann's Encyclopedia of Industrial Chemistry; 2000, 14 Pages.
Plate Molecular Still; GIG Karasek: Distillation, Evaporation, Drying; Abstract Only, 3 Pages, 2015.
Presentation of Dr.-Ing. Ernst W. Munich, Cairo, 20th of Mar. 2007, Degumming of plant oils for different applications, 30 Pages.
Presentation of W. De Greyt, W. Gibson and M. Kellens, Abu Dhabi, UAE, Apr. 15-16, 2008, Recent Developments in Bleaching, Deodorisation and Physical Refining of Oils and Fats, 30 Pages.
Schwab, A.W. et al. "Diesel Fuel from Thermal Decomposition of Soybean Oil"; Journal of the American Oil Chemists' Society; Nov. 1998, vol. 65, No. 11, pp. 1781-1786.

(56) References Cited

OTHER PUBLICATIONS

Sulzer Chemtech Broucher, "Film Evaporation Technology" 12 Pages, 2012.
Tall Oil Production and Processing New Zealand Institute of Chemistry, https://nzic.org.nz/ChemProcesses/forestry/4G.pdf, 11 pages, Retrieved on Sep. 26, 2017.
Tall Oil, Kirk-Othmer Encyclopedia of Chemical Technology, John Wiley & Sons, Inc., pp. 1-7, 2000.
Wang, H. et al. "Feasibility of Implementing Biorefinery at Pulp and Paper Mills", Biomass Chemical Engineering, Sep. 2009, vol. 43, No. 5, 5 Pages.
Zinkel, Duane F. and James Russell, editors "Naval Stores: Production, Chemistry, Utilization", Pulp Chemicals Association, 1989, New York, NY 10165, pp. 28-37, 176-183, 224-235, 354-363.

* cited by examiner

PROCESS AND SYSTEM FOR PRODUCING FUEL COMPONENTS

CLAIM FOR PRIORITY

This application claims priority under 35 USC 371 to International Application No. PCT/FI2011/051046, filed on Nov. 25, 2011, which claims priority to Finnish Patent Application No. 20106252, filed Nov. 26, 2010, and Finnish Patent Application No. 20115217, filed Mar. 3, 2011, each of which is hereby incorporated by reference in its entirety.

FIELD OF THE INVENTION

The present invention relates to a process and system for producing fuel components, and more particularly to a process and system for producing fuel components from a material of biological origin. The process is a process comprising purifying of the feed material and refining the purified feed material to form a mixture of hydrocarbon compounds from which mixture liquid hydrocarbon compounds are separated and further fractionated into fuel components. The present invention relates further to fuel components obtained by the process of the present invention as well as to the use of the fuel components and a mixture comprising the fuel components.

BACKGROUND OF THE INVENTION

Raw materials of biological origin are potential sources of various biofuels or biofuel components. These raw materials can be converted to biofuels by feeding the raw material through a catalytic reactor by contacting it simultaneously with gaseous hydrogen. The resulting product is drawn off the reactor as a product stream which can be further fractionated for example by distillation to form biofuel/biofuel components.

There are however various problems related to production processes of biofuels from the raw materials of biological origin, such as poisoning and clogging of the catalyst material used in the production processes. There are impurities in the raw materials of biological origin, such as metals and solids that cause the inactivation of the catalyst material and prevent it to function properly. In order to prevent the inactivation of the catalyst and to prolong its lifetime, the raw material can be purified and/or pretreated before feeding it to the hydrotreatment process. Purifying of the raw materials of biological origin to be suitable for feeding to a catalytic process is also challenging. Prior art describes various ways of doing this. However, these all have problems and the quality of the raw material is not always in required level for the catalytic step to be able to function in the most efficient way.

One possibility of purifying and/or pretreating a raw material of biological origin to be fed to catalytic hydrotreatment processes is ion-exchange with an acidic ion exchange resin. Another possibility is to use methods such as adsorption on a suitable material, ion exchange, or acid washing to remove alkaline metals and earth alkaline metals (Na, K, Ca). Yet another possibility is to use degumming for removing metals in the feed. Degumming is performed by washing the biological feed at 90-105° C., 300-500 kPa(a), with $H_3PO_4$, NaOH and soft water and separating the formed gums. A major amount of metal components, which are harmful for the hydrotreatment catalyst, are removed from the feedstock during the degumming stage.

If the raw material of biological origin contains tall oil, depitching of the crude tall oil can be used to remove impurities from the tall oil. Depitched tall oil is obtained by evaporating crude tall oil, for example by thin-film evaporator. U.S. Pat. No. 5,705,722 describes converting unsaturated fatty acids, for example tall oil fatty acids to naphtha and cetane improvers for diesel fuels. According to the document, a feedstock comprising tall oil is fed through a hydrodeoxygenating reactor containing NiMo/CoMo catalyst where it is contacted with gaseous hydrogen. The resulting product is drawn off the reactor as one product stream which is further fractionated by distillation, to naphtha and middle distillate which is said to be used as a cetane improver. Also a residue is drawn off from the reactor. However, this process has disadvantages, for example the yield of biofuel or biofuel components, i.e. naphtha and cetane improvers, is poor. This is due to the fact that in depitching a huge amount of valuable raw material for hydrogenation is lost as residue, i.e. pitch. According to the document, the residue is used as such as fuel for boilers.

BRIEF DESCRIPTION OF THE INVENTION

An object of the present invention is thus to provide a process and a system for implementing the process so as to overcome the above problems. The objects of the invention are achieved by a process and a system, which are characterized by what is stated in the independent claims. The preferred embodiments of the invention are disclosed in the dependent claims.

The invention is based on the idea of purifying the material of biological origin and hydroprocessing the purified material of biological origin to form a mixture of hydrocarbon compounds, separating gaseous compounds from said mixture of hydrocarbon compounds to form liquid hydrocarbon compounds and fractionating said liquid hydrocarbon compounds to obtain fuel components. The purifying of the material of biological origin is performed by evaporating.

By evaporation is meant here any suitable separation method for separating two or more components from each other, such as gases from liquid, which separation method is based on utilising the differences in the vapour pressure of the components. Examples of such separation methods are evaporation, flashing and distillation. Examples of suitable evaporation methods are those using thin film evaporation technology. The evaporators can thus be selected from the group of thin film evaporator, falling film evaporator, short path evaporator, plate molecular still and any other evaporator using thin film evaporation technology. The evaporation unit can comprise one, two, three or more evaporators which can be either of the same type or different type and are selected independently from the suitable separation methods presented above. If the evaporation unit comprises more than one evaporator, the evaporators are arranged in series.

An advantage of the process and system of the invention is that when the material of biological origin is evaporated, the impurities, such as metals and solids are retained in the concentrate and the condensate retrieved from the evaporation is ready to be fed to the hydroprocessing reactor. If the evaporation is accomplished in two steps, i.e. the evaporation unit comprises two evaporators, water and light components are first evaporated from the material of biological origin in order to make the second evaporation step more efficient. Also the risk of carry-over is reduced in a controlled way. If the evaporation is accomplished in three steps, i.e. the evaporation unit comprises three evaporators, water and light components are first evaporated from the material of biological origin in the first evaporation step in order to make the following evaporation steps more efficient. In the second and third evaporation steps the residual fraction containing pitch is minimized by evaporating the liquid product of the first evaporation step. The advantage of using a three step evaporation unit is that the second evaporation step can be a small and cheap evaporator that removes light components from the material. The following third evaporation step can also be smaller and cheaper than the second step in two-step evaporation. Consequently, a three step evaporation unit can be cheaper than a two step evaporation unit. The heavy fraction from the second evaporation step is directed to the third evaporator, from which the heavy fraction is removed.

An advantage of such purifying with a two, three or more step evaporation is that the boiling takes place in a more controlled manner because low boiling light components, i.e. components having boiling point of 150-210° C., preferably 150-170° C., in normal pressure, do not cause so much "carry over", i.e. migrating of the compounds having a boiling point range at the higher end of the above boiling point ranges as well as impurities to the vapour in the subsequent evaporation step. The light components, can be, if desired, returned back to the material of biological origin or refined further in another process or sold further as such.

An advantage of the present invention compared to those known from the prior art is that the material of biological origin purified according to the present invention is ready to be fed to hydroprocessing and the hydroprocessing is able to produce fuel components with excellent yield. Especially when the feed contains tall oil, the process of the invention is advantageous compared to those known from the prior art. An advantage of the present invention is that the pitch can be avoided in the product fractions. A further advantage of the present invention is that the cold flow properties of the fuel are improved when the fuel components of the present invention are used in a fuel pool.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
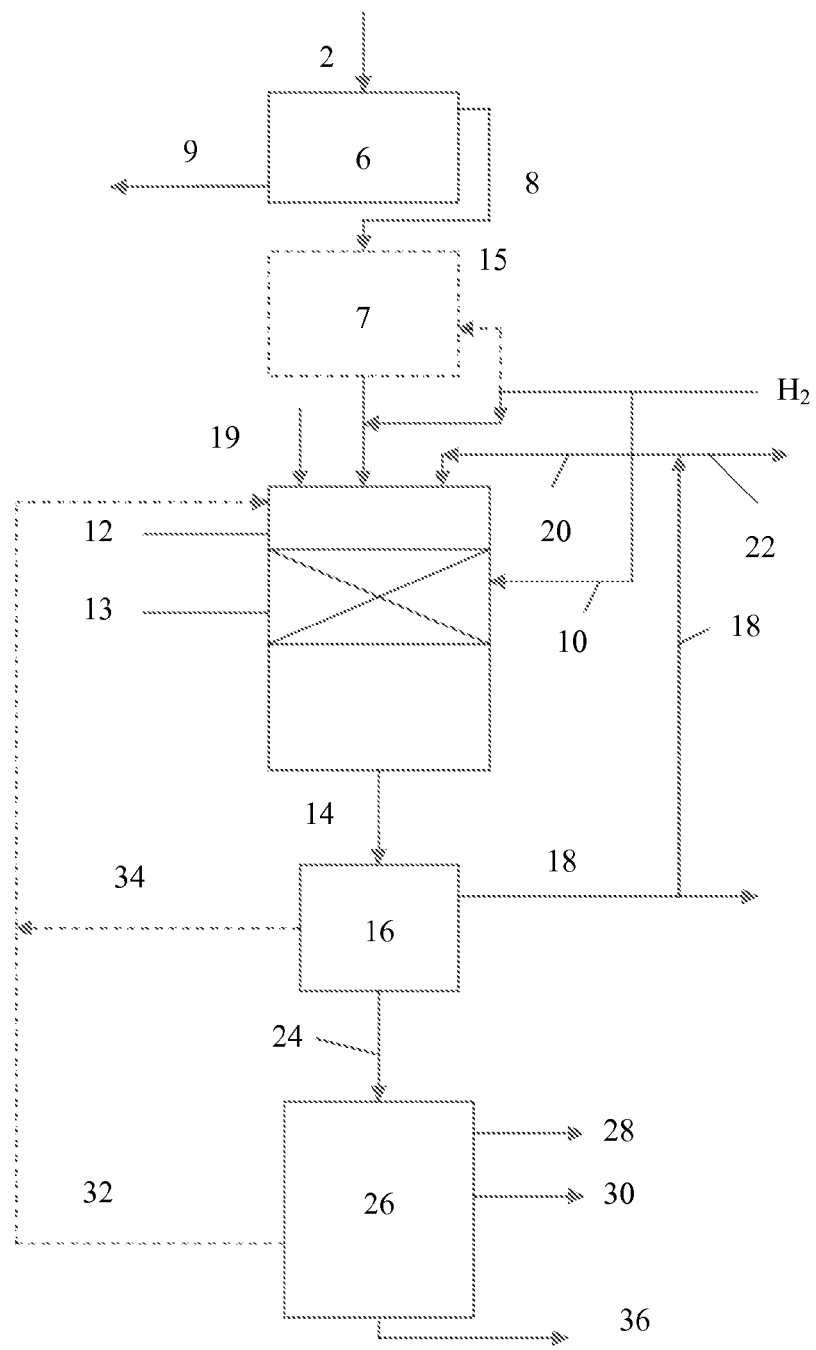
FIG. 1 shows a system according to the present invention for the process for producing the fuel components.

The present invention relates to a process for producing fuel components from a material of biological origin, the process comprising the following steps a) evaporating the material of biological origin for removing impurities from the material of biological origin to produce purified biological material, b) hydroprocessing said purified biological material in the presence of hydrogen gas and at least one catalyst to form a mixture of hydrocarbon compounds, c) separating gaseous compounds from said mixture of hydrocarbon compounds to obtain liquid hydrocarbon compounds, d) fractionating said liquid hydrocarbon compounds to obtain fuel components.

The process further comprises a step e) for recycling a portion of the liquid hydrocarbon compounds obtained from the separation or fractionation back to the hydroprocessing.

The material of biological origin is any material of biological origin. Preferably, the material of biological origin is selected from a group consisting of i) any kind of fats, any kind of waxes, plant fats, plant oils, plant waxes; animal fats, animal oils, animal waxes, fish fats, fish oils, fish waxes, and ii) fatty acids or free fatty acids obtained from plant fats, plant oils, plant waxes; animal fats, animal oils, animal waxes; fish fats, fish oils, fish waxes, and mixtures thereof by hydrolysis, transesterification or pyrolysis, and iii) esters obtained from plant fats, plant oils, plant waxes; animal fats, animal oils, animal waxes; fish fats, fish oils, fish waxes, and mixtures thereof by transesterification, and iv) metal salts of fatty acids obtained from plant fats, plant oils, plant waxes; animal fats, animal oils, animal waxes; fish fats, fish oils, fish waxes, and mixtures thereof by saponification, and v) anhydrides of fatty acids from plant fats, plant oils, plant waxes; animal fats, animal oils, animal waxes; fish fats, fish oils, fish waxes, and mixtures thereof, and vi) esters obtained by esterification of free fatty acids of plant, animal and fish origin with alcohols, and vii) fatty alcohols or aldehydes obtained as reduction products of fatty acids from plant fats, plant oils, plant waxes; animal fats, animal oils, animal waxes; fish fats, fish oils, fish waxes, and mixtures thereof, and viii) recycled food grade fats and oils, and fats, oils and waxes obtained by genetic engineering, ix) dicarboxylic acids or polyols including diols, hydroxyketones, hydroxyaldehydes, hydroxycarboxylic acids, and corresponding di-or multifunctional sulphur compounds, corresponding di-or multifunctional nitrogen compounds, and x) compounds derived from algae, molds, yeasts, fungi and/or other microorganisms capable of producing compounds mentioned in from i) to ix) or compounds similar to those, xi) mixtures of said material of biological origin.

According to an embodiment of the present invention the material of biological origin is selected form the group consisting of fish oils such as Baltic herring oil, salmon oil, herring oil, tuna oil, anchovy oil, sardine oil, and mackerel oil; plant oils such as rapeseed oil, colza oil, canola oil, tall oil, crude tall oil, sunflower seed oil, soybean oil, corn oil, hemp oil, linen seed oil, olive oil, cottonseed oil, mustard oil, palm oil, peanut oil, castor oil, Jatropha seed oil, Pongamia pinnata seed oil, palm kernel oil, and coconut oil; and animal fats such as lard, tallow, rendered lard and rendered tallow, and waste and recycled food grade fats and oils, as well as fats, waxes and oils produced by genetic engineering; animal waxes such as bee wax, Chinese wax (insect wax), shellac wax, and lanoline (wool wax); plant waxes such as carnauba palm wax, Ouricouri palm wax, jojoba seed oil, candelilla wax, esparto wax, Japan wax, rice bran oil, terpenes, terpineols and triglycerides or mixtures thereof.

According to a preferred embodiment of the present invention the material of biological origin is tall oil or crude tall oil.

The evaporating in the process is performed with any commercially available suitable evaporation unit. Preferably the evaporating is performed in an evaporator using thin film evaporation technology. In this embodiment of the invention, the evaporator can thus be selected from the group of thin film evaporator, falling film evaporator, short path evaporator, plate molecular still and any other evaporator using thin film evaporation technology. The falling film evaporator refers to a falling film tube evaporator.

In one embodiment of the invention, the evaporation comprises a combination of thin film evaporation and short path evaporation. In another embodiment of the invention, the evaporation comprises a combination of thin film evaporation, plate molecular still evaporation and short path evaporation. Yet in another embodiment of the invention, the evaporation comprises a combination of falling film evaporation and thin film evaporation.

When the evaporation is performed the impurities, such as metals and solids contained in the material of biological origin are retained in the concentrate recovered from the evaporation unit. The evaporating of the material of biological origin can be performed either in one, two, three or more steps. Having more than one evaporating step provides the advantage that the boiling in the evaporation steps following the first step takes place in a more controlled manner because low boiling light components do not cause so much "carry over", i.e. migrating of the impurities to the vapour. The light compounds separated in the first step can be recycled back to the evaporation unit or to another process step and refined in another production line or sold as such. In the case when the feed is crude tall oil, the light compounds comprise components having boiling point of 150-210° C. in normal pressure, preferably 150-170° C., such as turpentine components, and light components boiling in a similar boiling range as turpentine. According to an embodiment of the present invention the evaporation is performed in an evaporator using thin film evaporation technology. The evaporator can thus be selected from the group of thin film evaporator, falling film evaporator, short path evaporator, plate molecular still and any other evaporator using thin film evaporation technology.

The evaporating in the process comprises one, two, three or more evaporation steps.

The metals and solids removed from the material of biological origin are for example lignin, several metals consisting mostly of Na, Fe, P, Si and sulfates, e.g. $Na_2SO_4$ and $H_2SO_4$.

The process of the present invention further comprises a step e) for recycling a portion of the liquid hydrocarbon compounds obtained from the separation or fractionation back to the hydroprocessing.

According to a preferred embodiment of the invention, the evaporation is performed in two steps by feeding the material of biological origin to an evaporation unit comprising two evaporators.

In the first step of the evaporation water and light components are removed at a temperature of 50-250° C. and a pressure of 5-100 mbar, preferably at a temperature of 120-200° C. and a pressure of 10-55 mbar. The evaporator is preferably a thin film evaporator or a falling film evaporator. In the second step the fraction containing pitch is minimized by evaporating the liquid product of the first evaporation step at a temperature of 200-450° C. and a pressure of 0-50 mbar, preferably 300-390° C. and a pressure of 0.01-15 mbar. The evaporator is preferably a thin film evaporator.

According to another preferred embodiment of the invention, the evaporation is performed in three steps by feeding the material of biological origin to an evaporation unit comprising three evaporators.

In three step evaporation, in the first step, water and light components are removed at a temperature of 50-250° C. and a pressure of 5-100 mbar, preferably at a temperature of 120-200° and a pressure of 10-55 mbar. The evaporator is preferably a thin film evaporator or a falling film evaporator. In the second step the liquid product of the first evaporation step is evaporated at a temperature of 180-350° and a pressure of 0.1-40 mbar, preferably at a temperature of 200-270° and a pressure of 0.1-20 mbar. The evaporator is preferably a plate molecular still or a thin film evaporator. Most preferably the evaporator is a thin film evaporator. The distillate of the second step is recovered as purified material and the liquid fraction is directed to third evaporation step. In the third step the fraction containing pitch is minimized by evaporating the liquid product of the second evaporation step at a temperature of 200-450° C. and a pressure of 0-50 mbar, preferably at a temperature of 300-390° and a pressure of 0.01-10 mbar. The evaporator is preferably a short path evaporator or a thin film evaporator. The purified material recovered from the third step is combined with the purified material of the second step and used as feed material for hydroprocessing.

As a result of the purification metals, such as Na, P and Si are removed from the material of biological origin. Metals deactivate catalysts and are therefore not desirable in a feed to a hydroprocessing reactor. An advantage of the present invention is that the yield of the purified biological material obtained from the evaporation is very good, 65-95%, in a preferable embodiment 80-95% and in a most preferable embodiment 88-94%. After the purification by evaporating the purified biological material is fed to the hydroprocessing.

In the process according to the present invention, the evaporation is accomplished in such a manner that the amount of residue from the evaporation is very small, it ranges from 5 to 15%, preferably under 10% and most preferably from about 5 to 6% from the feed. In the depitching according to prior art, the amount of pitch from evaporation is from 20 to 30% from the feed. In the process of the invention the process conditions (temperature, pressure) of the evaporation are controlled in such a way that the heavy neutral components in the feed are withdrawn with the condensate, and not taken out with the heavy fraction as in prior art depitching. When the amount of heavy fraction is small, it means that the amount of purified biological material is higher that of the prior art processes.

In one embodiment of the invention, the evaporating comprises more than one evaporation steps and the light components are removed from the first evaporation step.

In another embodiment of the invention the evaporating comprises more than one evaporation steps and the condensate of the first evaporation step is recovered and fed to a second evaporation step.

In addition to selecting optimal evaporating process conditions, the catalyst in the hydroprocessing is selected so that it is capable of transforming these heavy neutral components in the purified material to biofuel components. A prior art HDO catalyst is not able to do that, which can be clearly seen from the test results (Table 2) that are presented later on in this specification: the distillation curve shows, that sample CTO HDO mid cut 100% could not be distilled to the end, but an amount of 9% of the product was recovered as heavy residue. In the samples CTO HW Mid cut 100% and CTO HDO+HW Mid Cut 100% (Table 3) prepared by the process of the invention no residue was recovered, but the samples could be distilled to the end (FBP <350° C.).

According to an embodiment of the present invention, between evaporating and hydroprocessing there may be optionally an additional purification. The additional purification may be realised using a guard bed, i.e. a separate pretreatment/purification bed prior to the hydroprocessing. The additional purification may also be realised by a purification bed or section located in connection with the hydropocessing reactor. The process of the present invention optionally comprises one or more guard beds. The one or more guard beds can be arranged either to separate guard bed units and/or in the hydroprocessing reactor.

The guard bed has the task of acting against harmful substances in the feed. The guard bed is typically activated gamma aluminium oxide or some commercially available purifying catalyst. The guard bed material may also comprise catalyst materials that are capable of catalysing hydroprocessing reactions. The catalyst material may comprise the same material/materials that are used in the hydroprocessing reactor. The guard bed or the guard bed units can retain both solid and solvated impurities of the feed of biological origin, such as silicon based anti-foaming agents of a tall oil process and harmful chemical elements. The guard bed and/or the guard bed units can be heated, unheated, pressurised or unpressurised, fed with hydrogen gas or without hydrogen gas. Preferably the guard bed and/or the guard bed units are heated and unpressurised.

There are basically two types of guard beds, i.e. active and inactive guard beds. The active guard beds take part in the purification of the feed and changing the chemical composition of the feed and they can be placed either in separate guard bed units or inside the hydroprocessing reactor itself. In an embodiment, the active guard bed comprises only activated gamma aluminium oxide. In another embodiment, the active guard bed comprises catalyst materials capable of catalysing hydroprocessing reactions, such as catalyst containing metals from group VI and/or VIII or mixtures or combinations thereof, which catalyst is capable of converting biological feed material to fuel components. In another embodiment, the active guard bed comprises NiW catalyst or a mixture or a combination of several thin layers or beds of NiW and NiMo catalysts on a support selected from $Al_2O_3$, zeolite, zeolite-$Al_2O_3$ and $Al_2O_3$—$SiO_2$.

The inactive guard beds merely take part in the purification of the feed. These guard beds comprise suitable passive or inert materials. The separate guard beds can be multiplied meaning there is one or several guard beds in a stand-by mode in parallel or in series with the guard bed(s) in use.

According to an embodiment of the present invention a side feed material of biological origin may be optionally fed to the hydroprocessing. Preferably the side feed comprises animal fats or other residues from biological origin suitable for fuel production. By using the side feed is accomplished the use of a broader range of possible starting materials.

The process of the present invention comprises hydroprocessing the purified biological material in the presence of at least one catalyst to form a mixture of fuel components. The hydroprocessing in the present invention can be done in one, two, three or more steps.

According to one embodiment of the present invention the hydroprocessing is done in one step. The catalyst is a catalyst capable of hydrodeoxygenating, isomerising, ring opening and cracking the purified biological material to form a mixture of fuel components. In this embodiment, the catalyst is selected so, that it hydrates the double bonds of the purified biological material fed to the hydroprocessing. The catalyst removes heteroatoms of the feed molecules, especially oxygen, by hydrating. The catalyst has a capability of hydrogenating the olefinic bonds of the compounds in the feed, opening at least one of the bicyclic rings, and cracking the side chains of hydrocarbon chains. In other words, hydrocarbons are hydrogenated, isomerized and/or cracked in a single step. The cracking/isomerizing are controlled by process variables, such as pressure and/or temperature and by the properties of the catalyst, for example by controlling its acidity. At the same time sulfur compounds are reduced to hydrogen sulphide. The catalyst contained in the hydroprocessing reactor is selected from catalysts containing metals from group VI and/or VIII of the Periodic System or mixtures or combinations thereof, which catalyst is capable of converting biological feed material to fuel components in a single step. In a preferred embodiment of the invention, the catalyst comprises NiW, typically on a support selected from $Al_2O_3$, zeolite, zeolite-$Al_2O_3$, and $Al_2O_3$—$SiO_2$. In a further preferred embodiment of the invention, the catalyst comprises NiW on an $Al_2O_3$ support.

In a still further preferred embodiment of the one-step process of the invention, the catalyst is a mixture or a combination of a NiW catalyst with a further catalyst. Said further catalyst may be selected from any catalysts containing metals from group VI and/or VIII of the Periodic System, such as Ni, Co, Mo, Pt, Pd, or mixtures or combinations thereof, such as NiMo and CoMo, typically on a support selected from $Al_2O_3$, zeolite, zeolite-$Al_2O_3$ or $Al_2O_3$—$SiO_2$. In a preferred embodiment, the further catalyst is NiMo on an $Al_2O_3$ support. In one preferred embodiment of the invention, the catalyst is a combination or a mixture or a combination of several thin layers or beds of NiMo and NiW catalysts.

According to another embodiment, the hydroprocessing is performed in two steps. In the first step the fatty acids contained in the feed material of biological origin are converted to n-paraffins and in the second step the obtained n-paraffins are isomerised and/or cracked. In the first step a catalyst is used which has a suitable metal, such as metals from Group VIII and/or VIB of the Periodic System may be used. Suitable catalysts are supported Pt, Pd, Ni, NiMo or a CoMo catalysts, on a suitable support, such as $Al_2O_3$ and/or $SiO_2$. The catalyst used in the isomerising step is for example a molecular sieve, which contains as a metal noble metals from the group VIII, such as Pt and/or Pd, or a NiW catalyst on a suitable support, such as $Al_2O_3$, zeolite, zeolite-$Al_2O_3$ or $Al_2O_3$—$SiO_2$.

In order to function and stay active the catalysts used in the present invention need organic sulphur. Therefore when the feed of biological origin does not in itself contain sulphur or its sulphur concentration is too low, additional sulphur is fed to the step of hydroprocessing. The additional sulphur can be fed to the hydroprocessing step together with the feed of purified biological origin or it can be fed separately to the hydroprocessing step. Additional sulphur can be supplied to the process in gaseous form like hydrogen sulphide, or it can be any material that produces hydrogen sulphide in the process, like organic sulphur compounds, such as dimethyl disulphide. The amount of additional sulphur depends on the amount of sulphur contained in the feed. A person skilled in the art is able to determine the amount of needed sulphur without undue burden. Generally, the $H_2$ feed/$H_2S$ ratio must be maintained over about 0.0001, preferably over about 0.001.

The catalyst material must be activated before it is effective and taken into use. The activation comprises several steps, of which one is treating the catalyst with activating sulphur compound, for example dimethyl disulphide. The procedure of activating thus comprises sulphiding of the catalyst. The activation of catalysts is common knowledge in the art and will thus not be discussed here in detail.

The catalyst contained in the reactors of the present invention can be in any suitable form. The catalyst used in the present invention can be diluted with silicon carbide, aluminium oxide, glass beads, less active catalyst and/or inert material. The catalyst used in the present invention can also be undiluted. The catalyst can be in catalyst bed and the bed can be graded by adjusting the activity, particle shape and/or size of the used catalyst. The diluting and grading of the catalyst help in controlling the exothermic balance of the reaction.

The hydroprocessing can be carried out in any kind of reactor, column, vessel, container, tube or pipe, which is suitable for hydroprocessing.

The hydroprocessing is carried out at a temperature range from about 280° C. to about 500° C., preferably from about 330° C. to about 430° C. The opening of the fused ring structures is also a desired property of the catalyst.

The hydroprocessing is carried out at a pressure of about 20 to about 200 bar, preferably at a pressure of about 50 to about 200 bar, more preferably at about 70 to about 120 bar.

The feed is pumped to the hydroprocessing reactor at a desired speed. Feed rate WHSV (weight hourly spatial velocity) of the feed material is typically in the range of about 0.2 to about 2.5, preferably from about 0.3 to 1.5.

The amount of hydrogen gas needed is determined by the amount of feed. The suitable amount of hydrogen can be determined by a person having ordinary skills in the art. Typically, the relation $H_2$ feed/feed is in the range of from about 350 to 3 000 Nl/l, preferably from about 500 to 2 500 Nl/l. (Nl=Normal liter).

According to an embodiment of the present invention the gaseous compounds separated from the liquid compounds are hydrogen gas, hydrogen sulphide, light fuel gases, mainly lighter than $C_5$ hydrocarbons.

According to an embodiment of the present invention the obtained fuel components are a fraction containing gasoline and/or naphtha and a fraction containing middle distillate. An advantage of the present invention is that there is no residue fraction as a result in the fractionating, this means that the material of biological origin can be processed to fuel components with an excellent yield. In the following is presented a system for producing fuel components which is suitable for performing the process of the present invention.

The present invention relates also to a system for producing fuel components from a material of biological origin, which is characterized in that the system comprises
  an evaporation unit 6 for removing impurities from the material of biological origin and producing a purified biological material,
  at least one hydroprocessing reactor 12, 12', 12" for hydroprocessing the purified biological material and producing a mixture of hydrocarbon compounds, the hydroprocessing reactor comprising at least one catalyst 13, 13', 13",
  at least one hydrogen inlet 10,15, 17, for feeding hydrogen gas to the hydroprocessing reactor 12, 12', 12",
  a separation unit 16 for separating gaseous compounds from the mixture of hydrocarbon compounds to obtain liquid hydrocarbon compounds,
  a fractionation unit 26 for fractionating the liquid hydrocarbon compounds recovered from the separation unit 16 into separate fractions of fuel components.

By evaporation unit is meant here any suitable unit for separating two or more components from each other, such as gases from liquid, which separation unit utilises the differences in the vapour pressure of the components. Examples of such separation units are evaporation units, flashing units and distillation units. The evaporation unit can comprise one, two, three or more evaporators which can be either of the same type or different type and are selected independently. If the evaporation unit comprises more than one evaporator, the evaporators are arranged in series.

The evaporation unit can be any commercially available suitable evaporation unit. The evaporation unit of the system of the present invention comprises one, two, three or more evaporators. In one preferred embodiment of the invention, the evaporation unit comprises two evaporators. In another preferred embodiment of the invention, the evaporation unit comprises three evaporators. According to an embodiment of the invention, the evaporators are selected from those using thin film evaporation technology. Preferably the evaporator(s) is/are selected independently from the group consisting of thin film evaporator, falling film evaporator, short path evaporator, plate molecular still and any other evaporator using thin film evaporation technology. Suitable combinations for evaporators (in this order) in the evaporation unit are:
  For two stage evaporation:
  TF+SP
  FF+TF
  TF+TF
  For three stage evaporation:
  TF+TF+SP
  TF+PMS+SP
  FF+TF+SP
  FF+TF+TF
  where
  TF=thin film evaporator
  FF=falling film tube evaporator
  SP=short path evaporator
  PMS=plate molecular still Thus in one embodiment, the evaporation in a two-step evaporation is performed by using a thin film evaporator in the first evaporation step and a short path evaporator in the second evaporation step. In another embodiment, the two-step evaporation is performed by using a thin film evaporator in the first evaporation step and a falling film evaporator in the second evaporation step. Yet in another embodiment, the two-step evaporation is performed by using a thin film evaporator both in the first and second evaporation steps. In a preferred embodiment, the two-step evaporation is performed by using a falling film evaporator in the first evaporation step and a thin film evaporator in the second evaporation step.

In one embodiment of a three-step evaporation, the evaporation the evaporation is performed by using a thin film evaporator in the first step, a plate molecular still in the second step and a short path evaporator in the third evaporation step. In another embodiment, the three-step evaporation is performed by using a thin film evaporator in the first step, a thin film evaporator in the second step and a short path evaporator in the third evaporation step. In another embodiment, the three-step evaporation is performed by using a falling film evaporator in the first step, a thin film evaporator in the second step and a short path evaporator in the third evaporation step. Yet in another embodiment, the three-step evaporation is performed by using a falling film evaporator in the first evaporation step, and a thin film evaporator in the second and third evaporation steps. The second evaporator in both two-step and three-step evaporation is most preferably a thin film evaporator.

The separation unit comprises one or more separators. The separation can be done in several stages. As separators any device capable of separating gases and liquids from each other, can be used. For example, flash units can be used as separators.

The fractionation unit comprises one or more fractionation devices which a person skilled in the art is able to construct. An example of a fractionation unit is a distillation unit.

The system of the present invention further comprises at least one recycling connection (32, 34) for recycling a portion of the liquid hydrocarbon compounds from the separation unit (16) and/or fractionation unit (26) back to the hydroprocessing reactor (12, 12', 12").

According to one embodiment the system of the invention comprises one hydroprocessing reactor (12) comprising catalyst (13), which is selected from any catalysts containing metals from Group VI and/or VIII of the Periodic System or mixtures or combinations thereof, which catalyst is capable of converting biological feed material to fuel components. In one preferred embodiment of the invention, the catalyst is NiW, typically on a support selected from $Al_2O_3$, zeolite, zeolite-$Al_2O_3$, and $Al_2O_3$—$SiO_2$. In another preferred embodiment of the invention, the catalyst is NiW on an $Al_2O_3$ support.

In a still further preferred embodiment comprising one hydroprocessing reactor, the reactor may comprise a mixture or a combination of a NiW catalyst with a further catalyst. Said further catalyst may be selected from any catalysts containing metals from group VI and/or VIII of the Periodic System, such as Ni, Co, Mo, Pd, Pt, or mixtures or combinations thereof, such as NiMo and CoMo, typically on a support selected from $Al_2O_3$, zeolite, zeolite-$Al_2O_3$ or $Al_2O_3$—$SiO_2$. In a preferred embodiment, the further catalyst is NiMo on an $Al_2O_3$ support. In one preferred embodiment of the invention, the catalyst is a combination or a mixture or a combination of several thin layers or beds of Ni—Mo and NiW catalysts.

According to another embodiment of the present invention the system comprises a first hydroprocessing reactor (12') and a second hydroprocessing reactor (12"). The first hydroprocessing (12') reactor comprises a first catalyst (13') which is any catalyst containing metals from Group VIII and/or VIB of the Periodic System on a suitable support capable of converting hydrocarbons to n-paraffines. The first catalyst (13') in the first hydroprocessing reactor (12') is selected from the group of Pt, Pd, Ni, NiMo and CoMo supported by alumina and/or silica. The second hydroprocessing reactor (12") comprises a second catalyst (13") which is selected from the group of Pt,Pd and NiW supported by $Al_2O_3$, zeolite, zeolite-$Al_2O_3$ or $Al_2O_3$—$SiO_2$.

According to one embodiment of the present invention that is presented in FIG. 1, the system of the present invention also comprises a first feed inlet 2 for feeding the material of biological origin to the evaporation unit 6, a second feed inlet 8 for feeding the purified biological material from the evaporation unit 6 to the hydroprocessing reactor 12. For recovering the concentrate from the evaporation unit 6 the system comprises a first concentrate outlet 9. For feeding the mixture of hydrocarbon compounds from the hydroprocessing reactor 12 to the separation unit 16 the system comprises a third feed inlet 14. The system comprises a first gas outlet 18 for removing the gaseous compounds, comprising hydrogen, hydrogen sulphide, light fuel gases and mainly lighter than $C_5$ hydrocarbons from the separation unit 16. There is also a fourth feed inlet 24 for feeding the liquid compounds from the separation unit 16 to the fractionation unit 26. The first gas outlet 18 is connected to a second gas outlet 22 for removing the desired gaseous compounds of the system and to a first gas inlet 20 from which the gaseous compounds can be recycled back to the hydroprocessing reactor 12. For feeding the hydrogen gas to the hydroprocessing reactor the system comprises a first hydrogen feed inlet 10 and a second hydrogen inlet 15. The system also comprises a first product outlet 28 for naphtha and/or gasoline and, second product outlet 30 for middle distillate compounds for recovering them from the fractionation unit 26. There is also a residue outlet 36 for recovering the heavy fraction from the fractionation unit 26. Heavy fraction contains pitch. When the feed material is crude tall oil or tall oil, there is no heavy fraction or the amount of it is very small.

Between the evaporation unit 6 and the hydroprocessing reactor 12 the system may comprise an additional purification unit 7, that is presented in the figure by a dotted line, such as a guard bed. If desired, hydrogen gas can be fed to the guard bed 7 through a second hydrogen gas inlet 15.

The system further comprises a first recycling outlet 32 for recycling a portion of the liquid product stream from the fractionation unit 26 back to the hydroprocessing reactor 12. The system also comprises a second recycling outlet 34 for recycling a portion of the liquid product stream from the separation unit 16 back to the hydroprocessing reactor 12.

The system of FIG. 1 comprises catalyst 13, which is any suitable catalyst or a combination or a mixture of catalysts capable of hydrodeoxygenating, isomerising and cracking the purified biological material to form a mixture of hydrocarbon compounds. Suitable catalysts for the system of FIG. 1 are defined above in connection with the description of the system comprising one hydroprocessing reactor.

Sulphur in a suitable form is fed to the hydroprocessing reactor 12 through a first sulphur feed inlet 19.

Figure 2:
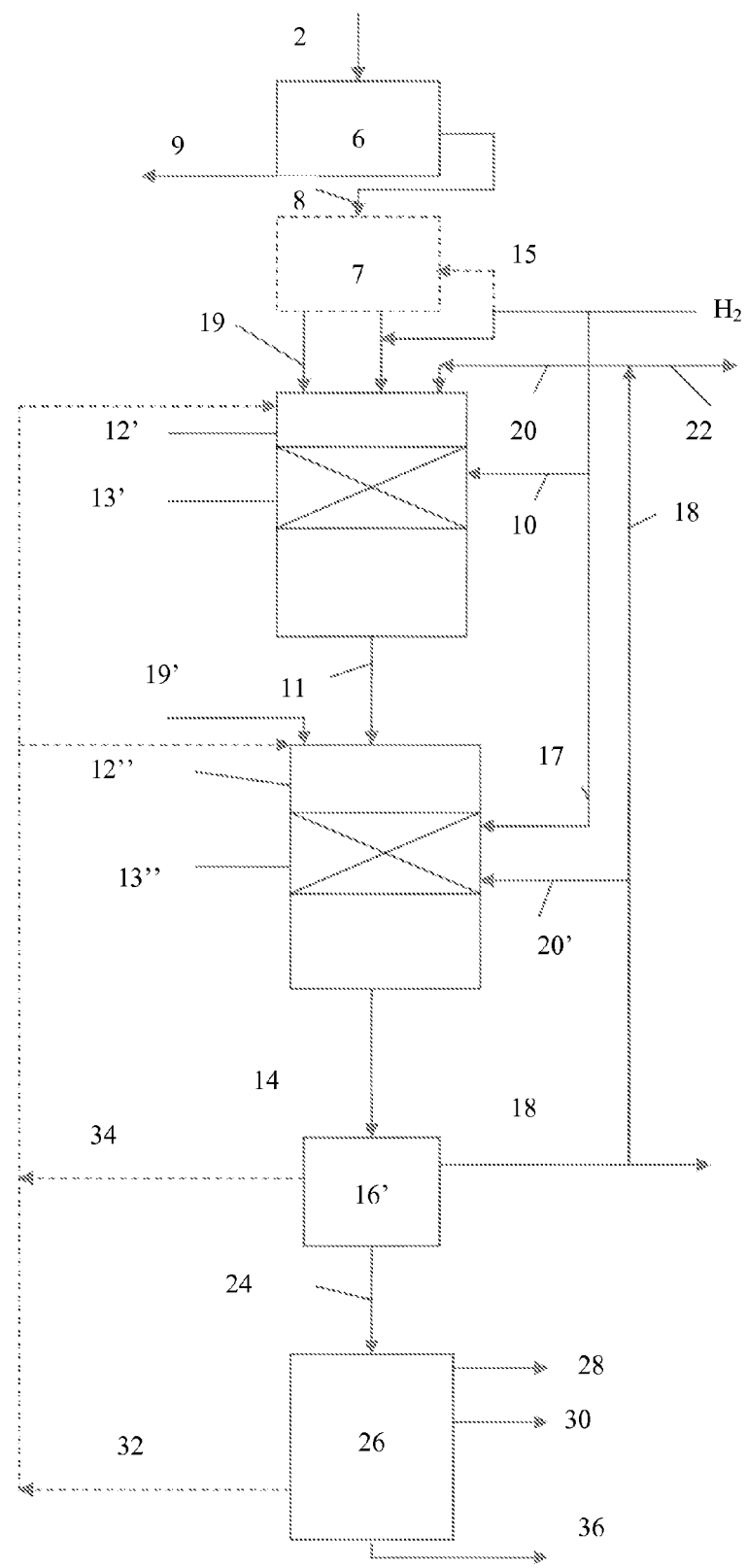
FIG. 2 shows another system according to the present invention for producing the fuel components.

According to another embodiment of the present invention in accordance with FIG. 2, the hydroprocessing is performed in two steps. The system comprises a first catalyst 13' in a first hydroprocessing reactor 12 and a second catalyst 13" arranged in the second hydroprocessing reactor 12". Suitable catalysts for the first catalyst 13' and the second catalyst 13" are defined above in connection with the description of the system comprising two hydroprocessing reactors.

The system of FIG. 2 comprises a first feed inlet 2 for feeding the material of biological origin to an evaporation unit 6, a second feed inlet 8 for feeding the purified biological material from the evaporation unit 6 to a first hydroprocessing reactor 12'.

For recovering the concentrate from the evaporation unit 6 the system comprises a first concentrate outlet 9.

For feeding the mixture of hydrocarbon compounds from the first hydroprocessing reactor 12' to a second hydroprocessing reactor 12" the system comprises an intermediate connection 11.

For feeding the hydroprocessed product from the second hydroprocessing reactor 12" to the separation unit 16 the system comprises a third feed inlet 14. The system comprises a first gas outlet 18 is arranged to remove the desired gaseous compounds, such as hydrogen, hydrogen sulphide, light fuel gases and mainly lighter than $C_5$ hydrocarbons from the separation unit 16 and a fourth feed inlet 24 for feeding the liquid compounds to the fractionation unit 26. The first gas outlet 18 is connected to on second gas outlet 22 for removing the desired gaseous compounds of the system and to a first gas inlet 20 from which the gaseous compounds can be recycled back to the first hydroprocessing reactor 12'. Gases can also be recycled back to the second hydroprocessing reactor 12" through a second gas inlet 20'.

For feeding the hydrogen gas to the hydroprocessing reactor 12' the system comprises a first hydrogen feed inlet 10. For feeding hydrogen to the second hydroprocessing reactor 12" the system comprises a third hydrogen inlet 17.

The system also comprises a first product outlet 28 for naphtha and/or gasoline and a second product outlet 30 for middle distillate compounds for recovering them from the fractionation unit 26. There is also a residue outlet 36 for recovering the heavy fraction from the fractionation unit 26. Heavy fraction contains pitch. When the feed material is crude tall oil or tall oil there is no heavy fraction from the fractionation.

The system further comprises a first recycling outlet 32 for recycling a portion of the liquid product stream from the fractionation unit 26 back to the hydroprocessing reactor(s) 12', 12". The system also comprises a second recycling outlet 34 for recycling a portion of the liquid product stream from the separation unit 16 back to the first hydroprocessing reactor 12' and/or to the second hydroprocessing reactor 12".

Between the evaporation unit 6 and the first hydroprocessing reactor 12' the system may comprise an additional purification unit 7, such as a guard bed. The additional purification unit 7 is optional and shown in dotted line in the FIG. 2. If desired, hydrogen gas can be fed to the guard bed 7 through a second hydrogen gas inlet 15.

Sulphur is fed to the hydroprocessing reactors 12', 12" through a first sulphur feed inlet 19 and a second sulphur feed inlet 19'.

The process of the present invention is now made clearer with reference to the system of FIG. 1. In the figure a system is shown for carrying our the process, wherein the material of biological origin is fed through a first feed inlet 2 to an evaporation unit 6 wherein the impurities contained in the material of biological origin are removed. The evaporation unit 6 comprises at least one evaporator that can be any suitable commercially available equipment capable of separating liquid components from gaseous components utilising the differences of the vapour pressures of the components. Examples of such suitable equipments are defined above.

From the evaporation unit 6 the purified biological material is fed to the hydroprocessing reactor 12 comprising catalyst 13 which is a catalyst capable of hydrodeoxygenating, isomerising and cracking in which reactor the purified biological material is hydroprocessed in a single step in the presence of hydrogen gas to form a mixture of hydrocarbon compounds which are fed though a third product inlet 14 to a separation unit 16. The catalyst 13 may also be a combination or a mixture of catalysts capable of hydrodeoxygenating, cracking and isomerizing the purified biological material to form a mixture of hydrocarbon compounds. Hydrogen gas is fed to the hydroprocessing reactor 12 through a first hydrogen gas inlet 10. Before feeding the purified biological material to the hydroprocessing reactor 12, it can be fed through a second feed inlet 8 to an optional purification unit 7.

In the separation unit 16 gaseous compounds are separated from the liquid compounds of the mixture of hydrocarbon compounds. The gaseous compounds are recovered through a first gas outlet 18, which is connected to a second gas outlet 22 for removing the gaseous compounds of the system and/or to a first gas inlet 20 from which part or all of the gaseous compounds can be recycled back to the hydroprocessing reactor 12, if desired. The separation can be done in several stages or repeated as often as needed.

From the separation unit 16 the liquid hydrocarbon compounds are fed through a fourth feed inlet 24 to a fractionation unit 26 wherein the liquid hydrocarbon compounds are fractionated into separated fractions. The fractions are gasoline and/or naphtha and middle distillate. Gasoline and/or naphtha is/are recovered through a first product outlet 28 and middle distillate is recovered through a second product outlet 30.

According to another embodiment of the present invention the process of the invention is performed in accordance with the system of FIG. 2. FIG. 2 shows a system for carrying out the process wherein the material of biological origin is fed through a first feed inlet 2 to an evaporation unit 6 wherein the impurities contained in the material of biological origin are removed. The evaporation unit 6 comprises at least one evaporator that can be any suitable commercially available equipment capable of separating liquid components from gaseous components utilising the differences of the vapour pressures of the components. Examples of such suitable equipments are defined above.

From the evaporation unit 6 the purified biological material is fed to the first hydroprocessing reactor 12' comprising a first catalyst 13', which is defined above. From the first hydroprocessing reactor 12' the once hydroprocessed material is fed to a second hydroprocessing reactor 12" for isomerising, which second hydroprocessing reactor 12" comprises a second catalyst 13", which is defined above.

The mixture of hydrocarbon compounds produced in the hydroprocessing reactors 12', 12" is fed further through a third product inlet 14 to a separation unit 16. Hydrogen gas is fed to the hydroprocessing reactor 12' through first hydrogen gas inlet 10 and to the second hydroprocessing reactor 12" through third hydrogen gas inlet 17. Before feeding the purified biological material to the hydroprocessing reactor 12', the material can be fed through a second feed inlet 8' to an optional purification unit 7.

In the separation unit 16 gaseous compounds are separated from the liquid compounds of the mixture of hydrocarbon compounds. The gaseous compounds are recovered through a first gas outlet 18, which is connected to a second gas outlet 22 for removing the gaseous compounds of the system and/or to a first gas inlet 20 from which part or all of the gaseous compounds can be recycled back to the hydroprocessing reactor 12', if desired. The separation can be done in several stages or repeated as often as needed.

From the separation unit 16 the liquid hydrocarbon compounds are fed through a fourth feed inlet 24 to a fractionation unit 26 wherein the liquid hydrocarbon compounds are fractionated into separated fractions. The fractions are gasoline and/or naphtha and middle distillate. Gasoline and/or naphtha is/are recovered through a first product outlet 28 and middle distillate is recovered through a second product outlet 30.

The reactions in hydroprocessing are highly exothermic reactions, in which temperature can rise to a level which is detrimental to the stability of the catalyst and/or product quality. In some cases, it may be necessary to control the temperature variations. Recirculation of at least a portion of the liquid product stream obtained from the separation unit, i.e. a mixture of fuel grade hydrocarbons, provides an efficient means for constraining the exothermic reaction whereby the recycled product stream acts as a media lowering the temperature of the bed in a controlled manner. Also, only a hydrocarbon fraction obtained from fractionation can be recycled.

The hydroprocessing reactor 12, 12', 12" may be any kind of reactor, column, vessel, container, tube or pipe, which is suitable for hydroprocessing.

The inlets, outlets and connections in accordance with this invention can be any kind of suitable means for letting in or out a feed or passing it though, for example pipe, tube, hose or connecting device suitable for this purpose.

The present invention relates also to fuel components obtained by a process wherein material of biological origin is evaporated for removing impurities, such as metals and solids from the material of biological origin to produce purified biological material, and said purified biological material is hydroprocessed in the presence of hydrogen gas and a catalyst to form a mixture of hydrocarbon compounds, gaseous compounds are separated from said mixture of hydrocarbon compounds to form liquid hydrocarbon compounds and said liquid hydrocarbon compounds are fractionated to obtain fuel components. The process details are the same as above presented in connection with the process of the present invention. According to a preferred embodiment of the present invention the fuel components are gasoline and/or naphtha and middle distillate compounds. The catalyst can be any suitable catalyst as presented above.

The present invention relates also to the use of the above mentioned fuel components as diesel fuel, gasoline fuel, heating fuel, jet fuel or aviation fuel and/or as their components.

The present invention relates also to a mixture comprising the above mentioned fuel component or fuel components and to the use of the mixture as diesel fuel, gasoline fuel, heating fuel, jet fuel, aviation fuel and/or as their components.

EXAMPLES

In the following examples 1 and 2, the impurities in the material of biological origin were removed by two different evaporation units. In Example 1, the evaporation unit comprised of two evaporators and in Example 2 the evaporation unit comprised of three evaporators. The material of biological origin was crude tall oil.

Example 1

Crude tall oil (CTO) was fed from storage at a temperature of 60° C. to an evaporation unit containing a thin film evaporator and a short path evaporator. The feed rate of the crude tall oil to the evaporation unit was between 30 and 80 kg/h. The temperature of the first evaporation step was 137° C. and the pressure was 18 mbar. Water, turpentine and light fatty acids were removed from the feed of crude tall oil.

The first evaporation step was performed on a thin film evaporator. In the first evaporator, all together 3% of the original amount of crude tall oil was evaporated, of which 2% was turpentine and light fatty acids and 1% was water. 97% of the amount of the original feed of crude tall oil was recovered as condensate from the first evaporator and fed further to a second evaporator. The second evaporation step was performed on a short path evaporator at 315° C. and 0.3 mbar. 5% of the amount of the original feed was removed from the second evaporation step as a heavy fraction comprising pitch. Distillate was recovered from the second evaporating step and the amount of it was 92% of the amount of the original feed of crude tall oil. The heavy fraction removed from the second evaporator contained 1600 ppm metals in total consisting mainly of Na, Fe, P and 10 to 20 other metals, and in addition to metals also $SO_4^{2-}$, in the form of $Na_2SO_4$ and lignin.

Example 2

Crude tall oil (CTO) with a metal content of 72 ppm was fed from storage at a temperature of 60° C. to an evaporation unit containing a thin film evaporator, a plate molecular still and a short path evaporator. The feed rate of the crude tall oil to the evaporation unit was between 30 and 80 kg/h. The temperature of the first evaporation step was 137° C. and the pressure was 18 mbar. Water, turpentine and light fatty acids were removed from the feed of crude tall oil.

The first evaporation step was performed on a thin film evaporator. In the first evaporator, all together 3% of the original amount of crude tall oil was evaporated, of which 2% was turpentine and light fatty acids and 1% was water. 97% of the amount of the original feed of crude tall oil was recovered as condensate from the first evaporator and fed further to a second evaporator. The second evaporation step was performed on a plate molecular still at 220° C. and 1 mbar. 50% of the amount of the original feed of crude tall oil was removed from the second evaporation step as a heavy fraction. Distillate was recovered from the second evaporating step and the amount of it was 47% of the amount of the original feed of crude tall oil. The heavy fraction from the second evaporation step was fed to the third evaporation step. The third evaporation step was performed on a short path evaporator at 330° C. and 0.1 mbar. The amount of the heavy fraction removed from the third evaporator was 5.5% from the original feed and it contained 1550 ppm metals in total, consisting mainly of Na, Fe, P and 10 to 20 other metals, and in addition to metals also $SO_4^{2-}$, in the form of $Na_2SO_4$ and lignin. Distillates from evaporation stages 2 and 3 were collected and mixed together. The superdepitched and purified CTO had a 5 ppm metal content.

Example 3

Hydroprocessing of the Purified CTO

The purified CTO obtained in accordance with Example 2 was processed by three different processes. The first process (CTO HDO) was a conventional process, where purified CTO was only hydrodeoxygenated by using a NiMo catalyst. The second process (CTO HW) was a process according to the invention, where purified CTO was hydroprocessed in a single step in the presence of hydrogen gas and a catalyst which is a catalyst capable of hydrodeoxygenating, isomerising and cracking in a single step to form a mixture of hydrocarbon compounds. The third process (CTO HDO+HW) was a process according to the invention, where purified CTO was hydroprocessed in a single step in the presence of hydrogen gas and a mixture of NiW and NiMo catalysts to form a mixture of hydrocarbon compounds. Table 1 presents the process parameters of processes CTO HDO, CTO HW and CTO HDO+HW.

TABLE 1

| Feed | CTO HDO | CTO HW | CTO HDO + HW |
|---|---|---|---|
| Catalyst | NiMo/$Al_2O_3$ | NiW/$Al_2O_3$ | NiW/$Al_2O_3$ + NiMo/$Al_2O_3$ |
| Reaction pressure (bar) | 75 | 90 | 90 |
| WHSV ($h^{-1}$) | 0.8-0.9 | 0.85-1.0 | 0.59-0.67 |
| Temperature of bed (° C.) | 375 | 375 | 373-376 |
| $H_2$ feed/feed (Nl/l) | 1175 | 925 | 2400-2750 |

WHSV = Weight Hourly Spatial Velocity

The products of these processes were fractionated to produce a light cut and a mid cut. Samples for measuring the properties of the products were prepared by blending a portion of the mid cut and EN 590 Diesel in various mixing ratios. The sample properties are shown in the tables 2 and 3 below.

The composition and properties of the product of the second process were measured. The results from analyses are summarized in Table 4 together with the standard values of EN 590 Diesel.

TABLE 2

Sample properties

| Description | Unit | Method | CTO HDO Mid cut 100% | CTO HDO Mid cut 5% EN590 Diesel 95% | CTO HDO Mid cut 10% EN590 Diesel 90% | CTO HDO Mid cut 15% EN590 Diesel 85% | CTO HDO Mid cut 20% EN590 Diesel 80% | EN590 Diesel 100% |
|---|---|---|---|---|---|---|---|---|
| Flash Point | °C. | SFS EN ISO 2719 | 66.0 | 62.0 | 63.0 | 62.0 | 61.0 | 59.5 |
| Cloud Point | °C. | ISO 3015:1992 | 12.0 | −6.0 | −5.0 | −5.0 | −3.0 | −5.0 |
| Cold Filter Plugging Point | °C. | SFS-EN 116 | 7.0 | −12.0 | −12.0 | −10.0 | −9.0 | −16.0 |
| IBP | °C. | EN ISO 3405 | 135.5 | 172.5 | 171.9 | 169.5 | 171.3 | 170.9 |
| 95% Recovered | % (v/v) | EN ISO 3405 | nd.* | 346.4 | 348.7 | 351.5 | 356.9 | 349.35 |
| FBP | °C. | EN ISO 3405 | nd.* | 354.9 | 357.3 | 364.5 | 373.6 | 358.67 |
| Recidue | | EN ISO 3405 | nd.* | 1.4 | 1.4 | 1.4 | 1.4 | 1.4 |

IBP = Initial Boiling Point
FBP = Final Boiling Point
COMMENTS:
*Not Detected, distillation ended after 91% distillation at 381° C. temperature. 9% heavy residue is not distillable in normal air pressure

TABLE 3

Sample properties

| Description | Unit | Method | CTO HDO + HW Mid cut 100% | CTO HW Mid cut 100% | CTO HW Mid cut 5% EN590 Diesel 95% | CTO HW Mid cut 10% EN590 Diesel 90% | CTO HW Mid cut 15% EN590 Diesel 85% | CTO HW Mid cut 20% EN590 Diesel 80% | EN590 Diesel 100% |
|---|---|---|---|---|---|---|---|---|---|
| Flash Point | °C. | SFS EN ISO 2719 | 56.0 | 60.5 | 59.5 | 59.5 | 59.5 | 59.0 | 59.5 |
| Cloud Point | °C. | ISO 3015:1992 | −8.0 | −2.0 | −5.0 | −6.0 | −6.0 | −7.0 | −5.0 |
| Cold Filter Plugging Point | °C. | SFS-EN 116 | −11.0 | −7.0 | −18.0 | −17.0 | −17.0 | −16.0 | −16.0 |
| IBP | °C. | EN ISO 3405 | 160.0 | 161.5 | 173.6 | 171.7 | 173.2 | 170.6 | 170.9 |
| 95% Recovered | % (v/v) | EN ISO 3405 | | 321.5 | 349.4 | 348.7 | 348.5 | 348.2 | 349.35 |
| FBP | °C. | EN ISO 3405 | 336.0 | 347.6 | 359.3 | 359.0 | 360.0 | 360.5 | 358.67 |
| Recidue | | EN ISO 3405 | | 1.3 | 1.4 | 1.4 | 1.4 | 1.4 | 1.4 |

TABLE 4

Results from analyses compared with EN590

| Test | Unit | Method | EN590 Grade E min | EN590 Grade E max | CTO HW Mid cut 100% |
|---|---|---|---|---|---|
| Cetane Number | | EN ISO 5165 | 51.0 | | 63.4 |
| Cetane Index | | EN ISO 4264 | 46.0 | | 63.7 |
| Distillation: | | EN ISO 3405 | | | |
| Recovered at 180° | % (v/v) | | | 10 | 3.4 |
| Recovered at 250° | % (v/v) | | | <65 | 24.9 |
| Recovered at 340° | % (v/v) | | 95 | | 96.3 |
| Recovered at 350° | % (v/v) | | 85 | | 97.8 |
| Final boiling point | C. | | | | 347.4 |
| Viscosity at 40° | mm$^2$/s | EN ISO 3104 | 2.0 | 4.5 | 2.701 |
| Flash Point | °C. | EN ISO 2719 | 60 | | 60 |
| Cloud Point | °C. | EN 23015 | −5 | | −1 |
| Cold Filter Plugging Point | °C. | EN 116 | −15 | | −7 |
| (on 10% distillation residue) | % (m/m) | EN ISO 10370 | | 0.30 | Less than 0.10 |
| Copper strip Corrosion (3 h at 50°) | | EN ISO 2160 | 1a | 1a | Class 1a |

TABLE 4-continued

Results from analyses compared with EN590

| Test | Unit | Method | EN590 Grade E min | EN590 Grade E max | CTO HW Mid cut 100% |
|---|---|---|---|---|---|
| Total Contamination | mg/kg | EN 12662 | | 24 | Less than 6.0 |
| Polycyclic aromatic hydrocarbons | % (m/m) | EN 12916 | | 11.0 | 1.6 |

Figure 3:
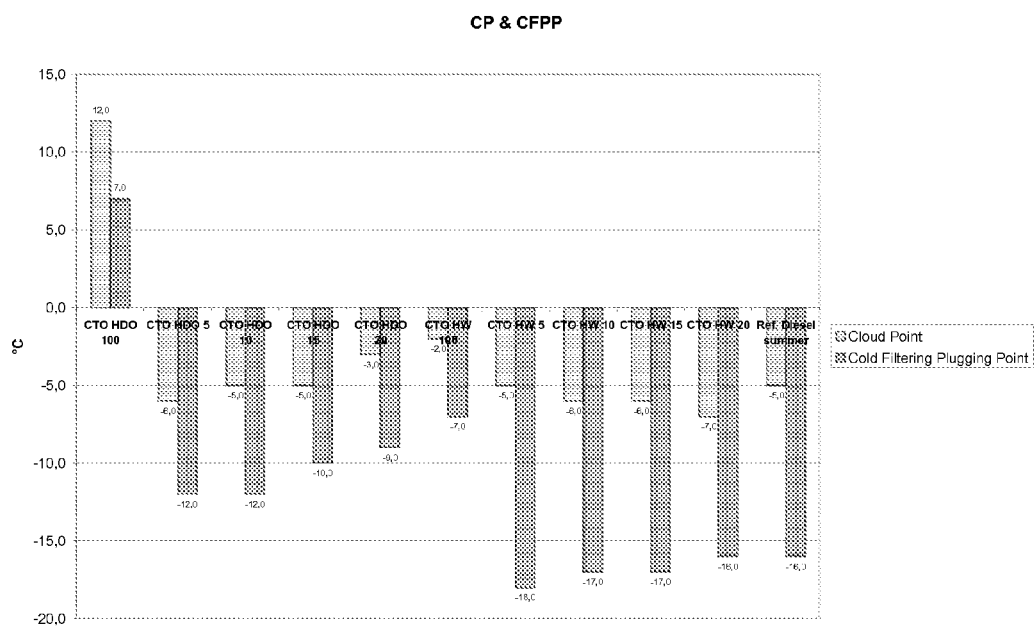
FIG. 3 shows as bar graph of the Cloud Points (CP) and Cold Filtering Plugging Points (CFPP) of the samples prepared in Example 3.

From the tables above it is obvious that the CTO HDO mid cut is poor as a blending component in terms of distillation and cold flow properties. CTO HW and CTO HW+HDO mid cuts perform well and the Cloud Point of the blend is improved and Cold Filter Plugging Point maintained within the EN 590 Grade E without disturbing the distillation properties. The Cloud Points (CP) and Cold Filtering Plugging Points (CFPP) of the samples are presented in FIG. 3.

In the process according to the invention the pitch compounds can be processed to valuable transportation fuel products whereas in the conventional hydrodeoxygenating process the pitch component cannot be recovered in the distillation product. It is also obvious from the results and a clear advantage of the present invention that in the CTO HW and CTO HW+HDO the heavy fraction is converted to form a part of the fuel fractions, whereas in the known CTO HDO process the heavy fraction is not even separable from the raw product.

It will be obvious to a person skilled in the art that, as the technology advances, the inventive concept can be implemented in various ways. The invention and its embodiments are not limited to the examples described above but may vary within the scope of the claims.

The invention claimed is:

1. A process for producing fuel components from a material of biological origin, comprising the following steps
   a) evaporating the material of biological origin to remove impurities including metals and solids from the material of biological origin to produce purified biological material,
   where the amount of residue from evaporation is below 10%, calculated from the feed, whereby the evaporating is accomplished in three or more evaporation steps, where the evaporators are arranged in series and use thin film evaporation technology, and the first evaporation step is performed at a temperature of 50-250° C. and a pressure of 5-100 mbar,
   b) hydroprocessing said purified biological material in the presence of hydrogen gas and at least one catalyst capable of hydrodeoxygenating, isomerizing, ring opening and cracking to form a mixture of hydrocarbon compounds,
   c) separating gaseous compounds from said mixture of hydrocarbon compounds to obtain liquid hydrocarbon compounds,
   d) fractionating said liquid hydrocarbon compounds to obtain fuel components, and
   e) recycling a portion of the liquid hydrocarbon compounds obtained from the separation or fractionation back to the hydroprocessing.

2. The process according to claim 1, wherein the evaporating is accomplished in three evaporation steps.

3. The process according to claim 1, wherein the evaporator is selected from the group of thin film evaporator, falling film evaporator, short path evaporator and plate molecular still.

4. The process according to claim 1, wherein the material of biological origin is selected from a group consisting of
   i) any kind of fats, any kind of waxes, plant fats, plant oils, plant waxes, animal fats, animal oils, animal waxes, fish fats, fish oils, fish waxes;
   ii) fatty acids or free fatty acids obtained from plant fats, plant oils, plant waxes, animal fats, animal oils, animal waxes, fish fats, fish oils, fish waxes, and mixtures thereof by hydrolysis, transesterification or pyrolysis;
   iii) esters obtained from plant fats, plant oils, plant waxes, animal fats, animal oils, animal waxes, fish fats, fish oils, fish waxes, and mixtures thereof by transesterification;
   iv) metal salts of fatty acids obtained from plant fats, plant oils, plant waxes, animal fats, animal oils, animal waxes, fish fats, fish oils, fish waxes, and mixtures thereof by saponification;
   v) anhydrides of fatty acids from plant fats, plant oils, plant waxes, animal fats, animal oils, animal waxes, fish fats, fish oils, fish waxes, and mixtures thereof;
   vi) esters obtained by esterification of free fatty acids of plant, animal and fish origin with alcohols;
   vii) fatty alcohols or aldehydes obtained as reduction products of fatty acids from plant fats, plant oils, plant waxes; animal fats, animal oils, animal waxes; fish fats, fish oils, fish waxes, and mixtures thereof, and
   viii) recycled food grade fats and oils, and fats, oils and waxes obtained by genetic engineering;
   ix) dicarboxylic acids or polyols including diols, hydroxyketones, hydroxyaldehydes, hydroxycarboxylic acids, and corresponding di- or multifunctional sulphur compounds, corresponding di- or multifunctional nitrogen compounds;
   x) compounds derived from algae, molds, yeasts, fungi and/or other microorganisms capable of producing compounds mentioned in i) to ix) or compounds similar to those; and
   xi) mixtures of said material of biological origin.

5. The process according to claim 1, wherein the material of biological origin is selected from the group consisting of fish oils; plant oils; animal fats; animal waxes; plant waxes; and mixtures thereof.

6. The process according to claim 1, wherein the hydroprocessing is accomplished in a single step and the catalyst is a catalyst containing metals from group VI and/or VIII or mixtures or combinations thereof, wherein said catalyst is capable of converting biological feed material to fuel components.

7. The process according to claim 6, wherein the catalyst is NiW or a mixture or combination of NiW and NiMo catalysts on a support selected from $Al_2O_3$, zeolite, zeolite-$Al_2O_3$, and $Al_2O_3$—$SiO_2$.

8. The process according to claim 1, wherein the hydroprocessing is accomplished in two steps and the catalyst in the first step is any catalyst containing metals from Group VIII and /or VIB of the Periodic System on a suitable support capable of converting hydrocarbons to n-paraffins and the catalyst in the second step is a catalyst which is selected from the group of Pt, Pd and NiW supported by $Al_2O_3$, zeolite, zeolite-$Al_2O_3$, or $Al_2O_3$—$SiO_2$.

9. The process according to claim 1, wherein the gaseous compounds separated comprise hydrogen gas, hydrogen sulphide, light fuel gases, and hydrocarbons lighter than $C_5$ hydrocarbons.

10. The process according to claim 1, wherein light components comprising components having boiling points of 150-210° C. are removed from the first evaporation step.

11. The process according to claim 10, wherein a condensate of the first evaporation step is recovered and fed to a second evaporation step.

12. The process according to claim 1, wherein the obtained fuel components are a fraction containing gasoline and/or naphtha and a fraction containing middle distillate.

13. A process for producing fuel components from a material of biological origin, comprising the following steps
   a) evaporating the material of biological origin to remove impurities including metals and solids from the material of biological origin to produce purified biological material, where the amount of residue from evaporation is below 10%, calculated from the feed, whereby the evaporating is accomplished in three or more evaporation steps, where the evaporators are arranged in series and use thin film evaporation technology,
   b) hydroprocessing said purified biological material in the presence of hydrogen gas and at least one catalyst capable of hydrodeoxygenating, isomerizing, ring opening and cracking to form a mixture of hydrocarbon compounds,
   c) separating gaseous compounds from said mixture of hydrocarbon compounds to obtain liquid hydrocarbon compounds,
   d) fractionating said liquid hydrocarbon compounds to obtain fuel components, and
   e) recycling a portion of the liquid hydrocarbon compounds obtained from the separation or fractionation back to the hydroprocessing.

14. The process according to claim 13, wherein the evaporating is accomplished in three evaporation steps.

15. The process according to claim 13, wherein the evaporator is selected from the group of thin film evaporator, falling film evaporator, short path evaporator and plate molecular still.

16. The process according to claim 13, wherein the material of biological origin is selected from a group consisting of
   i) any kind of fats, any kind of waxes, plant fats, plant oils, plant waxes, animal fats, animal oils, animal waxes, fish fats, fish oils, fish waxes;
   ii) fatty acids or free fatty acids obtained from plant fats, plant oils, plant waxes, animal fats, animal oils, animal waxes, fish fats, fish oils, fish waxes, and mixtures thereof by hydrolysis, transesterification or pyrolysis;
   iii) esters obtained from plant fats, plant oils, plant waxes, animal fats, animal oils, animal waxes; fish fats, fish oils, fish waxes, and mixtures thereof by transesterification;
   iv) metal salts of fatty acids obtained from plant fats, plant oils, plant waxes, animal fats, animal oils, animal waxes; fish fats, fish oils, fish waxes, and mixtures thereof by saponification;
   v) anhydrides of fatty acids from plant fats, plant oils, plant waxes; animal fats, animal oils, animal waxes; fish fats, fish oils, fish waxes, and mixtures thereof, and
   vi) esters obtained by esterification of free fatty acids of plant, animal and fish origin with alcohols;
   vii) fatty alcohols or aldehydes obtained as reduction products of fatty acids from plant fats, plant oils, plant waxes; animal fats, animal oils, animal waxes; fish fats, fish oils, fish waxes, and mixtures thereof, and
   viii) recycled food grade fats and oils, and fats, oils and waxes obtained by genetic engineering;
   ix) dicarboxylic acids or polyols including diols, hydroxyketones, hydroxyaldehydes, hydroxycarboxylic acids, and corresponding di- or multifunctional sulphur compounds, corresponding di- or multifunctional nitrogen compounds;
   x) compounds derived from algae, molds, yeasts, fungi and/or other microorganisms capable of producing compounds mentioned in i) to ix) or compounds similar to those; and
   xi) mixtures of said material of biological origin.

17. The process according to claim 13, wherein the material of biological origin is selected from the group consisting of fish oils; plant oils; animal fats; animal waxes; plant waxes; and mixtures thereof.

18. The process according to claim 13, wherein the hydroprocessing is accomplished in a single step and the catalyst is a catalyst containing metals from group VI and/or VIII or mixtures or combinations thereof, wherein said catalyst is capable of converting biological feed material to fuel components.

19. The process according to claim 18, wherein the catalyst is NiW or a mixture or combination of NiW and NiMo catalysts on a support selected from $Al_2O_3$, zeolite, zeolite-$Al_2O_3$ and $Al_2O_3$—$SiO_2$.

20. The process according to claim 13, wherein the hydroprocessing is accomplished in two steps and the catalyst in the first step is any catalyst containing metals from Group VIII or VIB of the Periodic System on a suitable support capable of converting hydrocarbons to n-paraffins and the catalyst in the second step is a catalyst which is selected from the group of Pt, Pd and NiW supported by $Al_2O_3$, zeolite, zeolite-$Al_2O_3$ or $Al_2O_3$—$SiO_2$.

21. The process according to claim 13, wherein the gaseous compounds separated comprise hydrogen gas, hydrogen sulphide, light fuel gases, and hydrocarbons lighter than $C_5$ hydrocarbons.

22. The process according to claim 13, wherein light components comprising components having boiling points of 150-210° C. are removed from the first evaporation step.

23. The process according to claim 22, wherein a condensate of the first evaporation step is recovered and fed to a second evaporation step.

24. The process according to claim 13, wherein the obtained fuel components are a fraction containing gasoline and/or naphtha and a fraction containing middle distillate.

* * * * *